United States Patent
Handlin, Jr.

(10) Patent No.: US 7,439,301 B2
(45) Date of Patent: *Oct. 21, 2008

(54) BLOCK COPOLYMERS HAVING HIGH FLOW AND HIGH ELASTICITY

(75) Inventor: Dale L. Handlin, Jr., Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 309 days.

This patent is subject to a terminal disclaimer.

(21) Appl. No.: 11/069,487

(22) Filed: Mar. 1, 2005

(65) Prior Publication Data

US 2005/0197465 A1     Sep. 8, 2005

Related U.S. Application Data

(60) Provisional application No. 60/549,570, filed on Mar. 3, 2004.

(51) Int. Cl.
C08L 53/02     (2006.01)

(52) U.S. Cl. .............. 525/89; 525/98; 525/99; 525/240; 525/338; 525/339

(58) Field of Classification Search .......... 525/89, 525/98, 99, 240, 338, 339
See application file for complete search history.

(56) References Cited

U.S. PATENT DOCUMENTS

| | | | |
|---|---|---|---|
| 3,149,182 A | 9/1964 | Porter | |
| 3,244,664 A | 4/1966 | Zelinski et al. | |
| 3,281,383 A | 10/1966 | Zelinski et al. | |
| 3,431,323 A | 3/1969 | Jones | |
| 3,494,942 A | 2/1970 | Miki et al. | |
| RE27,145 E | 6/1971 | Jones | |
| 3,594,452 A | 7/1971 | De La Mare et al. | |
| 3,634,594 A | 1/1972 | Hiyama | |
| 3,670,054 A | 6/1972 | De La Mare et al. | |
| 3,692,874 A | 9/1972 | Farrar et al. | |
| 3,700,633 A | 10/1972 | Wald et al. | |
| 3,700,748 A | 10/1972 | Winkler | |
| 3,766,301 A | 10/1973 | De La Mare et al. | |
| 3,772,196 A | 11/1973 | St. Clair et al. | |
| 3,880,954 A | 4/1975 | Kahle et al. | |
| 3,985,830 A | 10/1976 | Fetters et al. | |
| 4,039,593 A | 8/1977 | Kamienski et al. | |
| 4,104,332 A | 8/1978 | Zelinski | |
| 4,107,131 A | 8/1978 | Gergen et al. | |
| 4,185,042 A | 1/1980 | Verkouw | |
| 4,188,432 A | 2/1980 | Holden et al. | |
| 4,273,946 A | 6/1981 | Newkirk et al. | |
| 4,286,077 A | 8/1981 | St. Clair et al. | |
| 4,296,008 A | 10/1981 | St. Clair et al. | |
| 4,379,891 A | 4/1983 | Haynes | |
| 5,060,818 A | 10/1991 | Doi et al. | |
| 5,075,377 A | 12/1991 | Kawabuchi et al. | |
| 5,191,024 A | 3/1993 | Shibata et al. | |
| 5,266,648 A * | 11/1993 | Masse | 525/314 |
| 5,272,214 A | 12/1993 | Custro et al. | |
| 5,627,235 A | 5/1997 | Himes | |
| 5,681,895 A | 10/1997 | Bening et al. | |
| 5,705,556 A | 1/1998 | Djiauw et al. | |
| 5,777,031 A | 7/1998 | Djiauw et al. | |
| 5,777,043 A | 7/1998 | Shafer et al. | |
| 5,891,957 A * | 4/1999 | Hansen et al. | 525/89 |
| 5,925,707 A | 7/1999 | Shafer et al. | |
| 6,045,883 A | 4/2000 | Akiyama et al. | |
| 6,184,292 B1 | 2/2001 | Hall et al. | |
| 6,239,218 B1 | 5/2001 | Yonezawa et al. | |
| 6,333,374 B1 | 12/2001 | Chen | |
| 6,451,913 B1 | 9/2002 | Masse | |
| 6,455,635 B1 | 9/2002 | Yonezawa et al. | |
| 6,458,891 B1 | 10/2002 | Yonezawa et al. | |
| 6,465,557 B1 | 10/2002 | De Keyzer et al. | |
| 6,582,829 B1 | 6/2003 | Quinn et al. | |
| 6,723,686 B2 | 4/2004 | Calle et al. | |
| 6,846,535 B2 | 1/2005 | De Groot et al. | |
| 2003/0134958 A1 | 7/2003 | Chen | |
| 2003/0204019 A1 | 10/2003 | Ding et al. | |
| 2003/0225209 A1 | 12/2003 | Handlin, Jr. et al. | |
| 2003/0232928 A1 | 12/2003 | Atwood et al. | |
| 2005/0197464 A1 | 9/2005 | Handlin, Jr. et al. | |
| 2007/0004830 A1 * | 1/2007 | Flood et al. | 524/69 |

FOREIGN PATENT DOCUMENTS

| | | |
|---|---|---|
| EP | 0 881 259 A2 | 12/1998 |
| EP | 0 910 160 A2 | 4/1999 |
| EP | 1 002 813 A1 | 5/2000 |
| EP | 1 275 891 A1 | 1/2003 |
| EP | 1 302 508 A1 | 4/2003 |
| EP | 1 333 508 | 8/2003 |
| EP | 1 307 509 | 2/2005 |
| WO | 99/05185 | 2/1999 |
| WO | 01 94466 A1 | 12/2001 |
| WO | 02/28965 | 4/2002 |
| WO | 03/064527 | 8/2003 |
| WO | 03/064528 | 8/2003 |
| WO | 03/066697 A1 | 8/2003 |
| WO | 03/082943 A1 | 10/2003 |
| WO | 2004/108784 A1 | 12/2004 |

* cited by examiner

Primary Examiner—Randy Gulakowski
Assistant Examiner—Olga Asinovsky
(74) Attorney, Agent, or Firm—Michael A. Masse; Dean F. Vance; Novak, Druce & Quigg, LLP

(57) ABSTRACT

Disclosed is an elastomeric hydrogenated block copolymer capable of being directly extruded or molded with a minimum of additives and having both high elasticity and low permanent set. The hydrogenated block copolymers have high melt flows allowing for ease in processing the hydrogenation block copolymers in melt processes such as extrusion and molding.

30 Claims, No Drawings

BLOCK COPOLYMERS HAVING HIGH FLOW AND HIGH ELASTICITY

CROSS-REFERENCE TO RELATED APPLICATIONS

The present application claims the benefit of U.S. Provisional patent application 60/549,570, filed Mar. 3, 2004, entitled Block Copolymers Having High Flow and High Elasticity.

BACKGROUND OF THE INVENTION

1. Field of the Invention

This invention relates to hydrogenated anionic block copolymers of mono alkenyl arenes and conjugated dienes, and to articles made from such block copolymers. This invention particularly relates to hydrogenated block copolymers of styrene and butadiene or isoprene.

2. Background of the Art

The preparation of block copolymers of mono alkenyl arenes and conjugated dienes is well known. One of the first patents on linear ABA block copolymers made with styrene and butadiene is U.S. Pat. No. 3,149,182. Uses for the block copolymers include injection molding, extrusion, blow molding, adhesives, and the like. These polymers have also been used in applications such as the modification of bitumen for the production of roofs and roads. Other uses of block copolymers include the production of films, fibers, and non-woven fabrics.

One example of such a block copolymer is in U.S. Pat. No. 4,188,432 to Holden, et al. Disclosed therein are shaped articles which are resistant to attack by fatty substances consisting essentially of high impact styrene-butadiene graft copolymer or a mixture thereof with no more than about 55% styrene homopolymer. The shaped articles also include small proportions of polyethylene or polypropylene and of a block copolymer X-Y-X in which each X is a polystyrene block of about 5,000 to 10,000 molecular weight and Y is a hydrogenated polybutadiene block of 25,000 to 50,000 molecular weight.

Another example of a block copolymer is found in U.S. Pat. No. 5,705,556 to Djiauw, et al. In this reference, it is disclosed that an extrudable elastomeric composition for making elastic fibers or films can be prepared using an elastomeric block copolymer, a polyphenylene ether, a polyolefin, and a tackifying resin. The article is further described as having from 25% to 75% by weight of a block copolymer having at least two monoalkenyl arene blocks separated by a hydrogenated conjugated diene block.

It is known in the art of preparing articles from polymers using injection molding, extrusion, and fiber spinning to use processing aids to reduce undesirable properties of the polymer being used. For example, fiber lubricants having excellent stability to smoking under conditions of use at elevated temperature in the mechanical and heat treatment operation subsequent to extrusion of the fiber, is disclosed in U.S. Pat. No. 4,273,946 to Newkirk, et al.

The above referenced block copolymer and today's other conventional highly elastic block copolymers, while having many desirable properties, can be difficult to process, particularly in extrusion, molding and fiber spinning applications. For example, it is commonly practiced to use substantial amounts of polyolefins, extending oils, tackifying resin and waxes and/or other processing aids in order to extrude conventional block copolymers. These additives can be difficult to add, often lead to reductions in elastic properties and can cause undesirable processing problems such as smoking and die buildup. On the other hand, conventional block copolymers can be made with good processability, however their mechanical properties are so poor that they are not generally useful in molded and extruded articles. It would be desirable in the art of preparing molded, extruded, and spun articles from block copolymers to prepare such articles using a block copolymer that does not require as much or even any processing aids and yet has excellent elastic properties.

SUMMARY OF THE INVENTION

In one aspect, the present invention is a selectively hydrogenated block copolymer having an S block and an E or $E_1$ block and having the general formula:

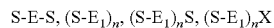

$$S\text{-}E\text{-}S, (S\text{-}E_1)_n, (S\text{-}E_1)_nS, (S\text{-}E_1)_nX$$

or mixtures thereof, wherein: (a) prior to hydrogenation the S block is a polystyrene block; (b) prior to hydrogenation the E block is a polydiene block, selected from the group consisting of polybutadiene, polyisoprene and mixtures thereof, having a molecular weight of from 40,000 to 70,000; (c) prior to hydrogenation the $E_1$ block is a polydiene block, selected from the group consisting of polybutadiene, polyisoprene and mixtures thereof, having a molecular weight of from 20,000 to 35,000; (d) n has a value of 2 to 6 and X is a coupling agent residue; (e) the styrene content of the block copolymer is from 13 percent to 25 percent; (f) the vinyl content of the polydiene block prior to hydrogenation is from 60 to 85 mol percent; (g) the block copolymer includes less than 15 weight percent lower molecular weight units having the general formula:

$$S\text{-}E \text{ or } S\text{-}E_1$$

wherein S, E and $E_1$ are as already defined; (h) subsequent to hydrogenation about 0-10% of the styrene double bonds have been hydrogenated and at least 80% of the conjugated diene double bonds have been hydrogenated; (i) the molecular weight of each of the S blocks is from 5,000 to 7,000; and (j) the melt index of the block copolymer is greater than or equal to 12 grams/10 minutes according to ASTM D1238 at 230° C. and 2.16 kg weight.

In still another aspect, the present invention is an article selected from the group consisting of a: film, sheet, coating, band, strip, profile, tube, molding, foam, tape, fabric, thread, filament, ribbon, fiber, plurality of fibers and fibrous web; wherein the article is prepared using a selectively hydrogenated block copolymer having an S block and an E or $E_1$ block and having the general formula:

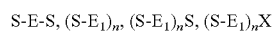

$$S\text{-}E\text{-}S, (S\text{-}E_1)_n, (S\text{-}E_1)_nS, (S\text{-}E_1)_nX$$

or mixtures thereof, wherein: (a) prior to hydrogenation the S block is a polystyrene block; (b) prior to hydrogenation the E block is a polydiene block, selected from the group consisting of polybutadiene, polyisoprene and mixtures thereof, having a molecular weight of from 40,000 to 70,000; (c) prior to hydrogenation the $E_1$ block is a polydiene block, selected from the group consisting of polybutadiene, polyisoprene and mixtures thereof, having a molecular weight of from 20,000 to 35,000; (d) n has a value of 2 to 6 and X is a coupling agent residue; (e) the styrene content of the block copolymer is from 13 percent to 25 percent; (f) the vinyl content of the polydiene block prior to hydrogenation is from 60 to 85 mol percent; (g) the block copolymer includes less than 15 weight percent lower molecular weight units having the general formula:

$$S\text{-}E \text{ or } S\text{-}E_1$$

wherein S, E and $E_1$ are as already defined; (h) subsequent to hydrogenation about 0-10% of the styrene double bonds have been hydrogenated and at least 80% of the conjugated diene double bonds have been hydrogenated; (i) the molecular weight of each of the S blocks is from 5,000 to 7,000 and (j) the melt index of the block copolymer is greater than or equal to 12 grams/10 minutes according to ASTM D1238 at 230° C. and 2.16 kg weight.

Another aspect of the present invention is an article selected from the group consisting of a film, tape, tube, strip, fiber, or filament made by direct extrusion capable of being used alone or in a laminate structure with a plurality of other layers; or a transparent, flexible part prepared by process selected from the group consisting of injection molding, slush molding, rotational molding, compression molding, and dipping; wherein the article is prepared using a selectively hydrogenated block copolymer having an S block and an E or $E_1$ block and having the general formula:

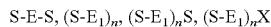

or mixtures thereof, wherein: (a) prior to hydrogenation the S block is a polystyrene block; (b) prior to hydrogenation the E block is a polydiene block, selected from the group consisting of polybutadiene, polyisoprene and mixtures thereof, having a molecular weight of from 40,000 to 70,000; (c) prior to hydrogenation the $E_1$ block is a polydiene block, selected from the group consisting of polybutadiene, polyisoprene and mixtures thereof, having a molecular weight of from 20,000 to 35,000; (d) n has a value of 2 to 6 and X is a coupling agent residue; (e) the styrene content of the block copolymer is from 13 percent to 25 percent; (f) the vinyl content of the polydiene block prior to hydrogenation is from 60 to 85 mol percent; (g) the block copolymer includes less than 15 weight percent lower molecular weight units having the general formula:

wherein S, E and $E_1$ are as already defined; (h) subsequent to hydrogenation about 0-10% of the styrene double bonds have been hydrogenated and at least 80% of the conjugated diene double bonds have been hydrogenated; (i) the molecular weight of each of the S blocks is from 5,000 to 7,000; and wherein the hydrogenated block copolymer has a melt index greater than 50 and the hysteresis recovery is greater than 60%.

In still another aspect, the present invention is a block copolymer having an S block and an E or $E_1$ block and having the general formula:

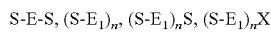

or mixtures thereof, wherein: (a) the S block is a polystyrene block; (b) the E block is a polydiene block, selected from the group consisting of polybutadiene, polyisoprene and mixtures thereof, having a molecular weight of from 40,000 to 70,000; (c) the $E_1$ block is a polydiene block, selected from the group consisting of polybutadiene, polyisoprene and mixtures thereof, having a molecular weight of from 20,000 to 35,000; (d) n has a value of 2 to 6 and X is a coupling agent residue; (e) the styrene content of the block copolymer is from 13 percent to 25 percent; (f) the vinyl content of the polydiene block prior to hydrogenation is from 60 to 85 mol percent; (g) the block copolymer includes less than 15 weight percent lower molecular weight units having the general formula:

wherein S, E and $E_1$ are as already defined; and (h) the molecular weight of each of the S blocks is from 5,000 to 7,000.

DETAILED DESCRIPTION OF THE PREFERRED EMBODIMENTS

In one embodiment, the present invention is a selectively hydrogenated block copolymer having an S block and an E or $E_1$ block and having the general formula:

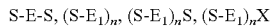

or mixtures thereof, wherein: (a) prior to hydrogenation, the S block is a polystyrene block; (b) prior to hydrogenation, the E block or $E_1$ block is a polydiene block, selected from the group consisting of polybutadiene, polyisoprene and mixtures thereof. The block copolymer can be linear or radial having three to six arms. General formulae for the linear configurations include:

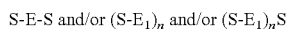

wherein the E block is a polydiene block, selected from the group consisting of polybutadiene, polyisoprene and mixtures thereof, having a molecular weight of from 40,000 to 70,000; the $E_1$ block is a polydiene block, selected from the group consisting of polybutadiene, polyisoprene and mixtures thereof, having a molecular weight of from 20,000 to 35,000; and n has a value from 2 to 6, preferably from 2 to 4, and more preferably an average of approximately 3. General formula for the radial configurations include:

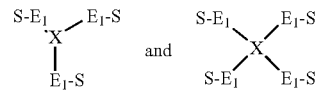

wherein the $E_1$ block is a polydiene block, selected from the group consisting of polybutadiene, polyisoprene and mixtures thereof, having a molecular weight of from 20,000 to 35,000; and X is a coupling agent residue.

As used herein, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

The block copolymers of the present invention are prepared by anionic polymerization of styrene and a diene selected from the group consisting of butadiene, isoprene and mixtures thereof. The polymerization is accomplished by contacting the styrene and diene monomers with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula $RLi_n$ where R is an aliphatic, cycloaliphatic, aromatic, or alkyl-substituted aromatic hydrocarbon radical having from 1 to 20 carbon atoms; and n has a value from 1 to 4. Preferred initiators include n-butyl lithium and sec-butyl lithium. Methods for anionic polymerization are well known and can be found in such references as U.S. Pat. No. 4,039,593 and U.S. Reissue Pat. No. Re 27,145.

The block copolymers of the present invention can be linear, linear coupled, or a radial block copolymer having a mixture of 2 to 6 "arms". Linear block copolymers can be made by polymerizing styrene to form a first S block, adding butadiene to form an E block, and then adding additional styrene to form a second S block. A linear coupled block copolymer is made by forming the first S block and E block and then contacting the diblock with a difunctional coupling agent. A radial block copolymer is prepared by using a coupling agent that is at least trifunctional.

Difunctional coupling agents useful for preparing linear block copolymers include, for example, methyl benzoate as disclosed in U.S. Pat. No. 3,766,301. Other coupling agents having two, three or four functional groups useful for forming radial block copolymers include, for example, silicon tetrachloride and alkoxy silanes as disclosed in U.S. Pat. Nos. 3,244,664, 3,692,874, 4,076,915, 5,075,377, 5,272,214 and 5,681,895; polyepoxides, polyisocyanates, polyimines, polyaldehydes, polyketones, polyanhydrides, polyesters, polyhalides as disclosed in U.S. Pat. No. 3,281,383; diesters as disclosed in U.S. Pat. No. 3,594,452; methoxy silanes as disclosed in U.S. Pat. No. 3,880,954; divinyl benzene as disclosed in U.S. Pat. No. 3,985,830; 1,3,5-benzenetricarboxylic acid trichloride as disclosed in U.S. Pat. No. 4,104,332; glycidoxytrimethoxy silanes as disclosed in U.S. Pat. No. 4,185,042; and oxydipropylbis(trimethoxy silane) as disclosed in U.S. Pat. No. 4,379,891.

In one embodiment of the present invention, the coupling agent used is an alkoxy silane of the general formula $R_x$—Si—$(OR')_y$, where x is 0 or 1, x+y=3 or 4, R and R' are the same or different, R is selected from aryl, linear alkyl and branched alkyl hydrocarbon radicals, and R' is selected from linear and branched alkyl hydrocarbon radicals. The aryl radicals preferably have from 6 to 12 carbon atoms. The alkyl radicals preferably have 1 to 12 carbon atoms, more preferably from 1 to 4 carbon atoms. Under melt conditions these alkoxy silane coupling agents can couple further to yield functionalities greater than 4. Preferred tetra alkoxy silanes are tetramethoxy silane ("TMSi"), tetraethoxy silane ("TESi"), tetrabutoxy silane ("TBSi"), and tetrakis(2-ethylhexyloxy)silane ("TEHSi"). Preferred trialkoxy silanes are methyl trimethoxy silane ("MTMS"), methyl triethoxy silane ("MTES"), isobutyl trimethoxy silane ("IBTMO") and phenyl trimethoxy silane ("PhTMO"). Of these the more preferred are tetraethoxy silane and methyl trimethoxy silane.

One important aspect of the present invention is the microstructure of the polymer. The microstructure relevant to the present invention is a high amount of vinyl in the E and/or $E_1$ blocks. This configuration can be achieved by the use of a control agent during polymerization of the diene. A typical agent is diethyl ether. See U.S. Pat. No. Re 27,145 and U.S. Pat. No. 5,777,031, the disclosure of which is hereby incorporated by reference. Any microstructure control agent known to those of ordinary skill in the art of preparing block copolymers to be useful can be used to prepare the block copolymers of the present invention.

In the practice of the present invention, the block copolymers are prepared so that they have from about 60 to about 85 mol percent vinyl in the E and/or $E_1$ blocks prior to hydrogenation. In another embodiment, the block copolymers are prepared so that they have from about 65 to about 85 mol percent vinyl content. In still another embodiment, the block copolymers are prepared so that they have from about 70 to about 85 mol percent vinyl content. Another embodiment of the present invention includes block copolymers prepared so that they have from about 73 to about 83 mol percent vinyl content in the E and/or $E_1$ blocks.

In one embodiment, the present invention is a hydrogenated block copolymer. The hydrogenated block copolymers of the present invention are selectively hydrogenated using any of the several hydrogenation processes know in the art. For example, the hydrogenation may be accomplished using methods such as those taught, for example, in U.S. Pat. Nos. 3,494,942; 3,634,594; 3,670,054; 3,700,633; and Re. 27,145, the disclosures of which are hereby incorporated by reference. Any hydrogenation method that is selective for the double bonds in the conjugated polydiene blocks, leaving the aromatic unsaturation in the polystyrene blocks substantially intact, can be used to prepare the hydrogenated block copolymers of the present invention.

The methods known in the prior art and useful for preparing the hydrogenated block copolymers of the present invention involve the use of a suitable catalyst, particularly a catalyst or catalyst precursor comprising an iron group metal atom, particularly nickel or cobalt, and a suitable reducing agent such as an aluminum alkyl. Also useful are titanium based catalyst systems. In general, the hydrogenation can be accomplished in a suitable solvent at a temperature within the range from about 20° C. to about 100° C., and at a hydrogen partial pressure within the range from about 100 psig (689 kPa) to about 5,000 psig (34,473 kPa). Catalyst concentrations within the range from about 10 ppm to about 500 ppm by wt of iron group metal based on total solution are generally used and contacting at hydrogenation conditions is generally continued for a period of time with the range from about 60 to about 240 minutes. After the hydrogenation is completed, the hydrogenation catalyst and catalyst residue will, generally, be separated from the polymer.

In the practice of the present invention, the hydrogenated block copolymers have a hydrogenation degree greater than 80 percent. This means that more than from 80 percent of the conjugated diene double bonds in the E or $E_1$ block has been hydrogenated from an alkene to an alkane. In one embodiment, the E or $E_1$ block has a hydrogenation degree greater than about 90 percent. In another embodiment, the E or $E_1$ block has a hydrogenation degree greater than about 95 percent.

In the practice of the present invention, the styrene content of the block copolymer is from about 13 percent to about 25 weight percent. In one embodiment, the styrene content of the block copolymer is from about 15 percent to about 24 percent. Any styrene content within these ranges can be used with the present invention. Subsequent to hydrogenation, from 0 to 10 percent of the styrene double bonds in the S blocks have been hydrogenated in the practice of the present invention.

The molecular weight of each of the S blocks in the block copolymers of the present invention is from about 5,000 to about 7,000 in the block copolymers of the present invention. In one embodiment, the molecular weight of each of the S blocks is from about 5,800 to about 6,600. The S blocks of the block copolymers of the present invention can be a polystyrene block having any molecular weight within these ranges.

In the practice of the present invention, the E blocks are a single polydiene block. These polydiene blocks can have molecular weights that range from about 40,000 to about 70,000. The $E_1$ block is a polydiene block having a molecular weight range of from about 20,000 to about 35,000. In one embodiment, the molecular weight range of the E block is from about 45,000 to about 60,000, and the molecular weight range for each $E_1$ block of a coupled block copolymer, prior to being coupled, is from about 22,500 to about 30,000.

One advantage of the present invention over conventional hydrogenated block copolymer is that they have high melt flows that allow them to be easily molded or continuously extruded into shapes or films or spun into fibers. This property allows end users to avoid or at least limit the use of additives that degrade properties, cause area contamination, smoking, and even build up on molds and dies. But the hydrogenated block copolymers of the present invention also are very low in contaminants that can cause these undesirable effects, such as diblocks from inefficient coupling. The block copolymers and hydrogenated block copolymers of the present invention have less than 15 weight percent of diblock content, such diblocks having the general formula:

$$SE \text{ or } SE_1$$

wherein S, E and $E_1$ are as previously defined. In one embodiment, the diblock level is less than 10 percent in another embodiment less than 8 percent. For example, where the structure of the hydrogenated block copolymer is $(S-E_1)_2X$, the block copolymer contains less than 10% of the $S-E_1$ species. All percentages are by weight.

One characteristic of the hydrogenated block copolymers of the present invention is that they have a low order-disorder temperature. The order-disorder temperature (ODT) of the hydrogenated block copolymers of the present invention is typically less than about 250° C. Above 250° C. the polymer is more difficult to process although in certain instances for some applications ODT's greater than 250° C. can be utilized. One such instance is when the block copolymer is combined with other components to improve processing. Such other components may be thermoplastic polymers, oils, resins, waxes or the like. In one embodiment, the ODT is less than about 240° C. Preferably, the hydrogenated block copolymers of the present invention have an ODT of from about 210° C. to about 240° C. This property can be important in some applications because when the ODT is below 210° C., the block copolymer may exhibit creep that is undesirably excessive or low strength. For purposes of the present invention, the order-disorder temperature is defined as the temperature above which a zero shear viscosity can be measured by capillary rheology or dynamic rheology.

For the purposes of the present invention, the term "melt index" is a measure of the melt flow of the polymer according to ASTM D1238 at 230° C. and 2.16 kg weight. It is expressed in units of grams of polymer passing through a melt rheometer orifice in 10 minutes. The hydrogenated block copolymers of the present invention have a desirable high melt index allowing for easier processing than similar hydrogenated block copolymers that have higher melt indexes. In one embodiment, the hydrogenated block copolymers of the present invention have a melt index of greater than or equal to 12. In another embodiment, the hydrogenated block copolymers of the present invention have a melt index of greater than or equal to 20. In still another embodiment, the hydrogenated block copolymers of the present invention have a melt index of greater than or equal to 40. Another embodiment of the present invention includes hydrogenated block copolymers having a melt index of from about 20 to about 100. Still another embodiment of the present invention includes hydrogenated block copolymers having a melt index of from about 50 to about 85.

The hydrogenated block copolymers of the present invention are especially suited for use in preparing articles requiring a melt based processing. For example, the hydrogenated block copolymers of the present invention can be used in a process selected from the group consisting of injection molding, over molding, insert molding, dipping, extrusion, roto molding, slush molding, fiber spinning, film making, and foaming. Articles made using such processes include: film, sheet, coating, band, strip, profile, tube, molding, foam, tape, fabric, thread, filament, ribbon, fiber, plurality of fibers, fibrous web and laminates containing a plurality of film and or fiber layers.

While the hydrogenated copolymers of the present invention have such low order-disorder temperatures and high melt indexes that they can be used to prepare articles without using processing aids, it is sometimes desirable to use such aids and other additives. Exemplary of such additives are members selected from the group consisting of other block copolymers, olefin polymers, styrene polymers, tackifying resins, end block resins, polymer extending oils, waxes, fillers, reinforcements, lubricants, stabilizers, engineering thermoplastic resins, and mixtures thereof.

When the additive is an olefin polymer, exemplary polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EAA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like. Preferred are high clarity, soft olefin polymers such as polyethylene and polypropylene copolymers, plastomers, elastomers and interpolymers. Examples include Affinity, Engage and Versify polymers from Dow Chemical and Exact and Vistamaxx polymers from Exxon Mobil. Still other polymers included hereunder are polyvinyl chloride (PVC) and blends of PVC with other materials.

The hydrogenated copolymers of the present invention can also be admixed with styrene polymers. Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene and styrene/olefin copolymers. Representative styrene/olefin copolymers are substantially random ethylene/styrene or propylene/styrene copolymers, preferably containing at least 20 weight percent copolymerized styrene monomer. Also included are styrene-grafted polypropylene polymers, such as those offered under the trade name Interloy®, originally developed by Himont, Inc. (now Basell). The hydrogenated copolymers of the present invention can also be admixed with other block copolymers such as styrene-diene-styrene triblock, radial or star block polymers, styrene-diene diblock polymers, and the hydrogenated versions of these polymers. Examples of high vinyl polymers which may be used include Hybrar® from Kurraray and Dynaron from JSR.

For the purposes of the specification and claims of the present invention, the term "engineering thermoplastic resin" encompasses the various polymers found in the classes listed in Table A below, and further defined in U.S. Pat. No. 4,107,131, the disclosure of which is hereby incorporated by reference.

TABLE A

Thermoplastic Polyester
Thermoplastic Polyurethane
Poly(aryl ether) and Poly(aryl sulfone)
Polycarbonate
Acetal resin
Polyamide
Halogenated thermoplastic
Nitrile barrier resin
Poly(methyl methacrylate)
Cyclic olefin copolymers When the additives used with the hydrogenated block copolymers of the present invention are tackifying resins, exemplary resins include polystyrene block compatible resins and midblock compatible resins. The polystyrene block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the hydrogenated (mid) block may be selected from the group consisting of compatible C5 hydrocarbon resins, hydrogenated C5 hydrocarbon resins, styrenated C5 resins, C5/C9 resins, styrenated terpene resins, fully hydrogenated or partially hydrogenated C9 hydrocarbon resins, rosins esters, rosins derivatives and mixtures thereof. These resins are e.g. sold under the trademarks "REGALITE", "REGALREZ", "ESCOREZ" and "ARKON". Also, one may use both a polystyrene block compatible resin and a midblock compatible resin.

When additives are elastomeric polyethylene or polypropylene copolymers, examples include Affinity, Engage and Versify polymers from Dow Chemical and Exact and Vistamaxx polymers from Exxon Mobil.

While the above referenced additives can be used, it is often desirable to limit their use to avoid problems inherent therewith including but not limited to smoking, die build up, mold build up, area contamination, and the like. In one embodiment, the total concentration of additives present in an article prepared with a hydrogenated block copolymer of the present invention is from about 0.001 percent to about 25 percent by weight. In another embodiment the total concentration of additives present in an article prepared with a hydrogenated block copolymer of the present invention is from about 0.001 percent to about 10 percent by weight. In still another embodiment the total concentration of additives present in an article prepared with a hydrogenated block copolymer of the present invention is from about 0.001 percent to about 5 percent by weight. Another embodiment of the present invention includes one where the total concentration of additives present in an article prepared with a hydrogenated block copolymer of the present invention is from about 0.001 percent to about 1 percent by weight.

The polymer of the present invention may be used in a large number of applications, either as a neat polymer or in a compound. The following various end uses and/or processes are meant to be illustrative, and not limiting to the present invention:

Polymer modification applications
Injection molding of toys, medical devices
Extruding films, tubing, profiles
Over molding applications for personal care, grips, soft touch applications, for automotive parts, such as airbags, steering wheels, etc
Dipped goods, such as gloves
Thermoset applications, such as in sheet molding compounds or bulk molding compounds for trays
Roto molding for toys and other articles
Slush molding of automotive skins
Thermal spraying for coatings
Blown film for medical devices
Hot melt adhesive
Blow molding for automotive/industrial parts
Films and fibers for personal hygiene applications
Tie layer for functionalized polymers
Roofing sheets
Geomembrane applications The hydrogenated block copolymers of the present invention have very elastic properties and yet also very high melt indexes. In one embodiment, the hydrogenated block copolymers of the present invention have a hysteresis recovery of greater than 50 percent and a permanent set of less than 20 percent on the first retraction cycle after elongation to 300 percent. For example, a preferred embodiment of the present invention is hydrogenated block copolymer having a melt index of greater than 50 and a hysteresis recovery of greater than 60 percent.

This embodiment is particularly useful for preparing an article selected from the group consisting of a film, tape, tube, strip, fiber, or filament made by direct extrusion capable of being used alone or in a laminate structure with a plurality of other layers; or a transparent, flexible part prepared by process selected from the group consisting of injection molding, slush molding, rotational molding, compression molding, and dipping.

These articles can be prepared, optionally including from 0.001 percent to 10 percent by weight of additives to enhance flow, stiffness or elasticity selected from a group including stabilizers, extender oil, waxes, tackifying resins, end block resins, surface modifiers and polyolefins. When present, the additive or additives can include a polyethylene or polypropylene homopolymer or copolymer. In one embodiment the polyethylene or polypropylene homopolymer or copolymer is a high clarity polypropylene copolymer that can be a polyethylene or polypropylene plastomer, elastomer or interpolymer.

EXAMPLES

The following examples are provided to illustrate the present invention. The examples are not intended to limit the scope of the present invention and they should not be so interpreted. Amounts are in weight parts or weight percentages unless otherwise indicated.

Example 1

A hydrogenated block copolymer is prepared by anionic polymerization of styrene and then butadiene in the presence of a microstructure control agent followed by coupling and then hydrogenation: a diblock polymer anion, S-B-Li, is prepared by charging 361 kg of cyclohexane and 16.7 kg, of styrene to a reactor. The reactor temperature was increased to about 40° C. Impurities were removed by adding small aliquots of s-butyllithium until the first evidence of color. 1,900 milliliters of a solution of an approximately 12% wt solution of s-butyllithium in cyclohexane was added, and the styrene was allowed to complete polymerization at about 60° C. The molecular weight of the polystyrene produced in this reaction was determined to be 6,400 by GPC. 320 g. of 1,2-diethoxypropane were added, and then 72.6 kg of butadiene were added at rates to allow the temperature to remain about 60° C. A sample collected at the end of the butadiene polymerization had a styrene content of 21.3% wt and a vinyl content of 69% basis $^1$H NMR and an overall molecular weight of 35,000 as determined by GPC. Following polymerization of the majority of the butadiene, 623 g. of isoprene was added. The isoprene was allowed to polymerize, and then 257 g of TESi was added, and the coupling reaction was allowed to proceed for 60 minutes at 60° C. Methanol (8.5 g, 0.1 mol per mol of Li) was added to terminate the reaction. The final product had a coupling efficiency of 91% and 72% of the coupled species were linear with the remaining 28 percent being 3-arm radial.

A sample of the polymer was hydrogenated to a residual olefin concentration of 0.09 meq/g in the presence of 20 ppm as [Co] of a solution of cobalt neodecanoate-aluminum triethyl catalyst (Al/Co=1.7 mol/mol). After hydrogenation under these conditions, the polymer remained 91% coupled. The catalyst was removed by washing with aqueous phosphoric acid, and the polymer was recovered via steam stripping, under conditions typical for hydrogenated polymers.

Samples were taken such that the molecular weight of the styrene block and butadiene/isoprene blocks could be determined. The amount of butadiene in the 1,2 configuration before hydrogenation and the coupling efficiency was also determined. The hydrogenated block copolymer was tested for melt flow and ODT. The results of the testing are displayed below in Table 1.

Example 2

A hydrogenated block copolymer was prepared by anionic polymerization of styrene and then butadiene in the presence of a microstructure control agent followed by coupling then hydrogenation: a diblock polymer anion, S-B-Li, was prepared by charging 348 kg of cyclohexane and 26 kg, of styrene to a reactor. The reactor temperature was increased to about 40° C. Impurities were removed by adding small aliquots of s-butyllithium until the first evidence of color. 3,160 milliliters of a solution of an approximately 12% wt solution of s-butyllithium in cyclohexane was added, and the styrene was allowed to complete polymerization at about 60° C. The molecular weight of the polystyrene produced in this reaction was determined to be 6,200 by GPC. The temperature was maintained at 60° C., 450 g. of 1,2-diethoxypropane were added, and then 90 kg of butadiene were added at such a rate as to allow the temperature to remain about 60° C. A sample collected at the end of the butadiene polymerization had a styrene content of 22% wt and a vinyl content of 81% basis $^1$H NMR and an overall molecular weight of 30,200 as determined by GPC. The butadiene was allowed to polymerize, and then 363 g of TESi was added, and the coupling reaction was allowed to proceed for 60 minutes at 60° C. Methanol (15 g, 0.1 mol per mol of Li) was added to terminate the reaction. The final product had a coupling efficiency of 89% and 65% of the coupled species were linear with the remaining 35% being 3-arm radial.

A sample of the polymer was hydrogenated to a residual olefin concentration of 0.17 meq/g in the presence of 20 ppm Ni/solution of a Nickel octanoate-aluminum triethyl catalyst (Al/Ni=2.1 mol/mol). After hydrogenation under these conditions, the polymer was 89% coupled. The catalyst was removed by washing with aqueous phosphoric acid, and the polymer was recovered via steam stripping, under conditions typical for hydrogenated polymers.

Samples were taken so that the molecular weight of the styrene block and butadiene blocks could be determined. The amount of butadiene in the 1,2 configuration before hydrogenation and the coupling efficiency was also determined. The hydrogenated block copolymer was tested for melt flow and ODT. The results of the testing are displayed below in Table 1.

Example 3

A hydrogenated block copolymer was prepared by anionic polymerization of styrene and then butadiene in the presence of a microstructure control agent followed by coupling then hydrogenation: a diblock polymer anion, S-B-Li, was prepared by charging 243 kg of cyclohexane and 20 kg, of styrene to a reactor. The reactor temperature was increased to about 40° C. Impurities were removed by adding small aliquots of s-butyllithium until the first evidence of color. 2,500 milliliters of a solution of an approximately 12% wt solution of s-butyllithium in cyclohexane was added, and the styrene was allowed to complete polymerization at about 60° C. The molecular weight of the polystyrene produced in this reaction was determined to be 6,100 by GPC. The temperature was maintained at 60° C., 210 g. of 1,2-diethoxypropane were added, and then 60 kg of butadiene were added at such a rate as to allow the temperature to remain about 60° C. A sample collected at the end of the butadiene polymerization had a styrene content of 22% wt and a vinyl content of 76% basis $^1$H NMR and an overall molecular weight of 27,700 as determined by GPC. The butadiene was allowed to polymerize, and then 243 g of TESi was added, and the coupling reaction was allowed to proceed for 60 minutes at 60° C. The final product had a coupling efficiency of 94% and 62% of the coupled species were linear with the remaining 38% being 3-arm radial.

A sample of the polymer was hydrogenated to a residual olefin concentration of 0.17 meq/g in the presence of 10 ppm Ni/solution of a Nickel octanoate-aluminum triethyl catalyst (Al/Ni=2.1 mol/mol). After hydrogenation under these conditions, the polymer remained 89% coupled. The catalyst was removed by washing with aqueous phosphoric acid, and the polymer was recovered via steam stripping, under conditions typical for hydrogenated polymers.

Samples were taken such that the molecular weight of the styrene block and butadiene blocks could be determined. The amount of butadiene in the 1,2 configuration before hydrogenation and the coupling efficiency was also determined. The hydrogenated block copolymer was tested for melt flow and ODT. The results of the testing are displayed below in Table 1.

Example 4

A polymer was prepared by the method of examples 2 and 3 where the styrene and butadiene charges were changed such that the styrene block had a molecular weight of 6,200, the overall molecular weight before coupling was 33,200, the vinyl content was 78% and the degree of coupling was 97%. After hydrogenation the coupling efficiency was 96% and the residual unsaturation was 0.1 meq/g.

Example 5

A polymer was prepared by the method of examples 2 and 3 with the exception that methyl trimethoxy silane was used as the coupling agent. The styrene and butadiene charges were such that the styrene block had a molecular weight of 6,200, the overall molecular weight before coupling was 32,800, the vinyl content was 76 and the degree of coupling was 94.

Example 6

A polymer was prepared by the method of examples 2 and 3 with the exception that tetramethoxy silane was used as the coupling agent. The styrene and butadiene charges were such that the styrene block had a molecular weight of 6,100, the overall molecular weight before coupling was 34,500, the vinyl content was 76 and the degree of coupling was 95.

Comparative Examples I, II and III

Comparative hydrogenated block copolymers I and II were prepared and tested substantially identically to Example 2 except that the styrene block molecular weight was greater than the maximum molecular weight of the invention. Comparative example III was prepared by sequential polymerization of styrene then butadiene then styrene followed by hydrogenation. The results of the testing are displayed below in Table 1.

TABLE 1

| Example # | S Block mwt (k) | E Block mwt (k) | Coupling Efficiency | 1,2-butadiene in E block % | ODT ° C. | Melt Index |
|---|---|---|---|---|---|---|
| 1 | 6.4 | 27.7 | 91 | 68 | 250 | 18 |
| 2 | 6.2 | 24.0 | 89 | 81 | 230 | 81 |
| 3 | 6.1 | 21.6 | 94 | 76 | 230 | 72 |
| 4 | 6.2 | 27.0 | 97 | 78 | 240 | 17 |
| 5 | 6.2 | 26.6 | 94 | 76 | <250 | 31 |
| 6 | 6.1 | 28.5 | 95 | 76 | <250 | 20 |
| I | 7.5 | 30.8 | 84 | 67 | 260 | 10 |
| II | 7.9 | 26.8 | 92 | 69 | 300+ | 6 |
| III | 7.2 | 55.8 | 8.5* | 68 | 300+ | 7 |

The molecular weight values listed are true molecular weights determined using Gel Permation Chromatography and Polystyrene standards.
The ODT's were measured using a Bohlin VOR rheometer.
Melt Index Test Method [230° C., 2.16 KG, ASTM D-1238]

Examples 1-4 and Comparative Examples I to III showed that the molecular weight of the S block can have a significant effect on melting index and/or ODT.

Examples 5-7

Films were prepared from some of the polymers in Table 1 by adding 0.15% release agent and 0.02% Ethanox 330 stabilizer followed by extrusion on a Davis Standard cast film line at 230° C. Polymers 2 and 3 gave low extrusion pressures and formed smooth, clear films because of their high flow. Comparative example III formed rougher films with high extrusion backpressure. The tensile and hysteresis properties of these films measured in the direction of extrusion according to ASTM D412 are shown in Table 2. All show excellent strength and elasticity, as demonstrated by the high first cycle recovery and low permanent set after elongation to 300%.

TABLE 2

| | EXAMPLE No. | | |
|---|---|---|---|
| | 5 | 6 | 7 |
| | POLYMER | | |
| | 2 | 3 | III |
| PROPERTIES Stress-Strain at 2 in/min | MD | MD | MD |
| Max. Stress at Break (psi) | 1887 | 1584 | 2044 |
| Strain at Break (%) | 970 | 938 | 922 |
| Stress at 100%, psi | 206 | 177 | 205 |
| Stress at 300%, psi | 440 | 382 | 429 |
| Hysteresis to 300%, 3 cycle. | | | |
| Cycle 1 recovery | 74 | 75 | 81 |
| Permanent set (%) | 9 | 8 | 10 |
| Max stress (psi) | 404 | 358 | 346 |

Examples 8-16

The polymer of Example 3 was compounded with a polypropylene copolymer with a melt flow of 30, Dow Chemical 6D43, a low molecular weight polypropylene homopolymer, Estaflex P1010 from Eastman Chemical, a hydrogenated hydrocarbon resin commercially available from Eastman Chemical as REGALREZ 1126 and a polystyrene commercially available from Nova Chemical as NOVA 555 in the proportions shown in Table 3 using a Brabender mixer at 220° C., the mixer running at about 65 RPM. The compounded hydrogenated copolymers were tested as above and the results are displayed below in Table 3.

TABLE 3

| | Example | | | | | | | | |
|---|---|---|---|---|---|---|---|---|---|
| | 8 Fraction | 9 Fraction | 10 Fraction | 11 Fraction | 12 Fraction | 13 Fraction | 14 Fraction | 15 Fraction | 16 Fraction |
| Polymer 3 | 1 | 0.95 | 0.9 | 0.8 | 0.9 | 0.9 | 0.8 | 0.8 | 0.8 |
| Dow 6D43 PP | | 0.05 | 0.1 | 0.2 | | | | | 0.07 |

TABLE 3-continued

| | \multicolumn{9}{c}{Example} | | | | | | | | |
|---|---|---|---|---|---|---|---|---|
| | 8 Fraction | 9 Fraction | 10 Fraction | 11 Fraction | 12 Fraction | 13 Fraction | 14 Fraction | 15 Fraction | 16 Fraction |
| Regalrez 1126 | | | | | | 0.1 | 0.1 | 0.13 | 0.13 |
| Eastoflex P1010 | | | | | 0.1 | | | 0.07 | |
| Nova 555 PS | | | | | | | 0.1 | | |
| Ethanox 330 | 0.0002 | 0.0002 | 0.0002 | 0.0002 | 0.0002 | 0.0002 | 0.0002 | 0.0002 | 0.0002 |
| Total (g) | 43.2 | 43.2 | 43.2 | 43.2 | 43.2 | 42.43 | 42.43 | 43.2 | 43.2 |
| PROPERTIES | | | | | | | | | |
| Clarity | Clear | Clear | Clear | Hazy | Clear | Clear | Hazy | Clear | Clear |
| Stress-Strain at 2 in/min | | | | | | | | | |
| Max. Stress at Break, psi | 1678 | 1406 | 1401 | 1239 | 1152 | 1350 | 1304 | 1266 | 1336 |
| Strain at Break, % | 936 | 915 | 932 | 747 | 951 | 1028 | 832 | 1082 | 1032 |
| Stress at 100%, psi | 224 | 233 | 244 | 321 | 180 | 178 | 132 | 130 | 175 |
| Stress at 300%, psi | 450 | 451 | 465 | 666 | 359 | 348 | 327 | 272 | 356 |
| Hysteresis to 300%, 3 cycle. | | | | | | | | | |
| Cycle 1 recovery | 73 | 65 | 60 | 52 | 68 | 70 | 84 | 75 | 65 |
| Permanent set (%) | 16 | 20 | 21 | 26 | 20 | 20 | 20 | 18 | 22 |
| Max stress (psi) | 338 | 348 | 329 | 497 | 302 | 281 | 220 | 212 | 289 |

Examples 9, 10 and 11 showed that polypropylene can be added to increase stiffness as shown by the modulus at 100 and 300% elongation, at the expense of hysteresis recovery. Example 12 showed that adding the less crystalline P1010 polypropylene decreases modulus as does the addition of tackifying resin Regalrez 1126. Combinations of tackifying resins and PS or PP can be used to increase flow or stiffness while maintaining clarity, however, the base polymer without modification retained a superior balance of properties compared to most of the compounds. This demonstrated the importance of making articles in a practical process using the neat polymer with a minimum amount of additives.

What is claimed is:

1. A selectively hydrogenated block copolymer having an S block and an E or $E_1$ block and having the general formula:

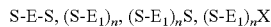

S-E-S, $(S-E_1)_n$, $(S-E_1)_n S$, $(S-E_1)_n X$ or mixtures thereof, wherein:
(a) prior to hydrogenation the S block is a polystyrene block;
(b) prior to hydrogenation the E block is a polydiene block, selected from the group consisting of polybutadiene, polyisoprene and mixtures thereof, having a molecular weight of from 40,000 to 70,000;
(c) prior to hydrogenation the $E_1$ block is a polydiene block, selected from the group consisting of polybutadiene, polyisoprene and mixtures thereof, having a molecular weight of from 20,000 to 35,000;
(d) n has a value of 2 to 6 and X is a coupling agent residue;
(e) the styrene content of the block copolymer is from 13 percent to 25 weight percent;
(f) the vinyl content of the polydiene block prior to hydrogenation is from 70 to 85 mol percent;
(g) the block copolymer includes less than 15 weight percent diblock having the general formula:

S-E or $S-E_1$ wherein S, E and $E_1$ are as already defined;

(h) subsequent to hydrogenation about 0-10% of the styrene double bonds have been hydrogenated and at least 80% of the conjugated diene double bonds have been hydrogenated;
(i) the molecular weight of each of the S blocks is from 5,000 to 7,000; and
(j) the melt index of the block copolymer is greater than or equal to 12 grams/10 minutes according to ASTM D1238 at 230° C. and 2.16 kg weight
(k) the order-disorder temperature of the block copolymer is less than 250° C.

2. The block copolymer of claim 1 wherein the styrene content of the block copolymer is from 15 percent to 24 weight percent.

3. The block copolymer of claim 1 wherein the vinyl content of the polydiene block is from 73 to 83 mol percent.

4. The block copolymer of claim 1 wherein the molecular weight each of the S blocks is from 5,800 to 6,600.

5. The block copolymer of claim 1 wherein the E block is a polybutadiene having a molecular weight of from 45,000 to 60,000, or the $E_1$ block is two or more coupled polybutadiene blocks, each of the polybutadiene blocks, prior to being coupled, having a molecular weight of from 22,500 to 30,000.

6. The block copolymer of claim 1 wherein the block copolymer includes less than or equal to 10 percent diblock having the general formula S-E or $S-E_1$.

7. The block copolymer of claim 5 wherein the block copolymer includes less than or equal to 8 percent lower molecular weight units having the general formula S-E or $S-E_1$.

8. The block copolymer of claim 1 wherein the structure of the hydrogenated block copolymer is $(S-E_1)_n X$ where n is 2 to 4 and the block copolymer contains less than 10% of the $S-E_1$ species.

9. The block copolymer of claim 1 wherein the E or $E_1$ block has a degree Of hydrogenation greater than 90%.

10. The block copolymer of claim 1 having an order-disorder temperature of less than 240° C.

11. The block copolymer of claim 10 having an order-disorder temperature of from 210° C. to 240° C.

12. The block copolymer of claim 1 having a melt index of greater than or equal to 20.

13. The block copolymer of claim 12 having a melt index of greater than or equal to 40.

14. The block copolymer of claim 8 having a melt index of from 20 to 100.

15. The block copolymer of claim 14 having a melt index of from 50 to 85.

16. The block copolymer of claim 1 having a hysteresis recovery of greater than 50%, and a permanent set of less than 20% on the first retraction cycle after elongation to 300%.

17. The block copolymer of claim 1 having a melt index greater than 50 and the hysteresis recovery is greater than 60%.

18. An article selected from the group consisting of a: film, sheet, coating, band, strip, profile, molding, tube, foam, tape, fabric, thread, filament, ribbon, fiber, plurality of fibers and fibrous web; wherein the article is prepared using a hydrogenated block copolymer of claim 1.

19. The article of claim 18 wherein the article is formed in a process selected from the group consisting of injection molding, over molding, dipping, extrusion, roto-molding, slush molding, fiber spinning, film making, and foaming.

20. The article of claim 19 wherein the hydrogenated block copolymer additionally comprises an additive selected from the group consisting of olefin polymers, styrene polymers, tackifying resins, polymer extending oils, fillers, reinforcements, lubricants, engineering thermoplastic resins, and mixtures thereof.

21. The article of claim 20 wherein the additive is present in an amount of from 0.001 percent to 10 percent by weight.

22. The article of claim 21 therein the additive is present in an amount of from 0.001 to 5 percent by weight.

23. The article of claim 22 wherein the additive is present in an amount of from 0.001 to 1 percent by weight.

24. An article selected from the group consisting of a film, tape, strip, fiber, or filament made by direct extrusion capable of being used alone or in a laminate structure with a plurality of other layers; or a transparent, flexible part prepared by process selected from the group consisting of injection molding, slush molding, rotational molding, compression molding, and dipping; wherein the article is prepared using a hydrogenated block copolymer of claim 16.

25. The article of claim 24 additionally comprising from 0.001 percent to 10 percent by weight of additives to enhance flow, stiffness or elasticity selected from a group including stabilizers, extender oil, waxes, tackifying resins, end block resins, surface modifiers and polyolefins.

26. The article of claim 25 wherein the additive is a polyethylene or polypropylene homopolymer or copolymer.

27. The article of claim 26 wherein the polyethylene or polypropylene homopolymer or copolymer is a plastomer, elastomer or interpolymer.

28. The article of claim 25 wherein the polypropylene is a high clarity polypropylene copolymer.

29. A block copolymer having an S block and an E or $E_1$ block and having the general formula:

$$\text{S-E-S, (S-E}_1)_n, \text{(S-E}_1)_n\text{S, (S-E}_1)_n\text{X}$$

or mixtures thereof, wherein:
(a) the S block is a polystyrene block;
(b) the E block is a polydiene block, selected from the group consisting of polybutadiene, polyisoprene and mixtures thereof, having a molecular weight of from 40,000 to 70,000;
(c) the $E_1$ block is a polydiene block, selected from the group consisting of polybutadiene, polyisoprene and mixtures thereof, having a molecular weight of from 20,000 to 35,000;
(d) n has a value of 2 to 6 and X is a coupling agent residue;
(e) the styrene content of the block copolymer is from 13 percent to 25 ;
(f) the vinyl content of the polydiene block is from 70 to 85 percent;
(g) the block copolymer includes less than 15 weight percent diblock having the general formula:

$$\text{S-E or S-E}_1$$

wherein S, E and $E_1$ are as already defined; and
(h) the molecular weight of each of the S blocks is from 5,000 to 7,000
(i) the melt index of the block copolymer is greater than or equal to 12 grams/10 minutes according to ASTM D1238 at 230° C. and 2.16 kg weight
(k) the order-disorder temperature of the block copolymer is less than 250° C.

30. The polymeric composition according to claim 1 wherein prior to hydrogenation the E block and $E_1$ block is a polydiene block, selected from the group consisting of polybutadiene, and mixtures of polybutadiene and polyisoprene.

* * * * *